United States Patent [19]
Matsuda

[11] Patent Number: 5,929,950
[45] Date of Patent: Jul. 27, 1999

[54] LIQUID CRYSTAL DISPLAY

[75] Inventor: Satoru Matsuda, Tokyo, Japan

[73] Assignee: NEC Corporation, Tokyo, Japan

[21] Appl. No.: 08/899,821

[22] Filed: Jul. 24, 1997

[30] Foreign Application Priority Data

Jul. 25, 1996 [JP] Japan ..................... 8-195923

[51] Int. Cl.⁶ ................................. G02F 1/1333
[52] U.S. Cl. ................................ 349/60; 349/58
[58] Field of Search ........................ 349/58, 60

[56] References Cited

U.S. PATENT DOCUMENTS

| | | | |
|---|---|---|---|
| 5,375,005 | 12/1994 | Komano | 359/48 |
| 5,486,942 | 1/1996 | Ichikawa et al. | 359/83 |
| 5,583,681 | 12/1996 | Shioya et al. | 349/60 |
| 5,587,817 | 12/1996 | Miyamoto et al. | 349/187 |
| 5,710,607 | 1/1998 | Iwamoto et al. | 349/150 |

FOREIGN PATENT DOCUMENTS

| | | |
|---|---|---|
| 386323 | 8/1991 | Japan . |
| 580307 | 4/1993 | Japan . |
| A5100125 | 4/1993 | Japan . |

*Primary Examiner*—William L. Sikes
*Assistant Examiner*—Joanne Kim
*Attorney, Agent, or Firm*—Sughrue, Mion, Zinn, Macpeak & Seas, PLLC

[57] ABSTRACT

A liquid crystal display (LCD) of the present invention includes a display device sustained by relatively soft elastic members at its four corners and by rigid members at the intermediate portions of its four sides. Therefore, the positional accuracy of the display device in the thicknesswise direction of its substrate and stable support are insured. Even when the LCD deforms due to an impact, the display device undergoes a minimum of deformation and is free from breakage. Further, the characteristic frequency of the display device is increased. This, coupled with the fact that the elastic portions absorb oscillation, protects the display device from secondary breakage.

6 Claims, 7 Drawing Sheets

LIQUID CRYSTAL DISPLAY

BACKGROUND OF THE INVENTION

The present invention relates to a liquid crystal display (LCD) and, more particularly, to an LCD including a display device support structure with improved impact resistance.

Today, LCDs are extensively used with handy data terminals, notebook type personal computers, personal word processors, on-board displays and other electronic apparatuses of the kind attaching importance to portability. An LCD for this kind of application is of transmission type and usually made up of a display device, chassis, backlight assembly, and a case (metallic frame). The LCD is received in the casing of an apparatus and affixed thereto by, e.g., screws.

There is an increasing demand with the above electronic apparatus for a thin, light weight and large size configuration which enhances portability and display function. This requires the LCD to have its display device implemented by a thinner, yet larger, glass substrate. Such a display device, however, cannot sufficiently withstand shocks, impacts and bending stresses. Particularly, the display device is apt to deform or even break up when subjected to an extraneous impact. Further, the display device continuously oscillates at its characteristic frequency due to the deformation, resulting in secondary breakage.

Some different approaches have been proposed for solving the above problems. Japanese Patent Laid-Open Publication No. 5-80307, for example, teaches an arrangement for absorbing, when an electronic apparatus is let fall or otherwise subjected to an impact, the resulting impact force directly acting from the casing of the apparatus on an LCD. Specifically, the LCD has a display device, circuit board, flexible cable and chassis implemented as a molding which are received in a metallic frame. When the LCD is fastened to the casing of the apparatus by screws, cushioning members are positioned between a bracket provided on the casing and the molding and between the molding and the screws. However, with the cushioning scheme, it is difficult to set up positional accuracy in the thicknesswise direction of the substrate of the display device. Moreover, because an impact causes the LCD and the casing of the apparatus to move relative to each other, the LCD is apt to contact the structural members of the apparatus. This is particularly true when the apparatus has a thin configuration.

Japanese Utility Mode Laid-Open Publication No. 3-86323 discloses an LCD in which a display device is mounted on an LC drive circuit board with the intermediary of an elastic member. The LC drive circuit board and display device are connected together by a connector. Even with this kind of scheme, it is difficult to insure the positional accuracy of the display device in the thicknesswise direction of its substrate, and to support it stably.

SUMMARY OF THE INVENTION

It is therefore an object of the present invention to provide an LCD allowing, when an electronic apparatus with the LCD is subjected to a shock or similar extraneous force, a minimum of impact force or bending stress to directly act on a display device included in the LCD.

It is another object of the present invention to provide an LCD capable of reducing, when a display device thereof is deformed, the resulting characteristic oscillation ascribable to the deformation.

It is a further object of the present invention to provide an LCD capable of preventing the positional accuracy of a display device thereof from decreasing in the thicknesswise direction of a substrate, and insuring stable support for the display device.

An LCD of the present invention includes a display device, a chassis contacting at least the peripheral portion of the underside of the display device, and a front frame retaining the display device between the front frame and the chassis. The chassis has its portions contacting the intermediate portions of the four sides of the display device formed of a relatively hard material, and has its portions contacting the four corners of the display device formed of a relatively soft elastic material.

BRIEF DESCRIPTION OF THE DRAWINGS

The above and other objects, features and advantages of the present invention will become apparent from the following detailed description taken with the accompanying drawings in which.

In the drawings, identical reference numerals denote identical structural elements.

DESCRIPTION OF THE PREFERRED EMBODIMENT

Figure 1:
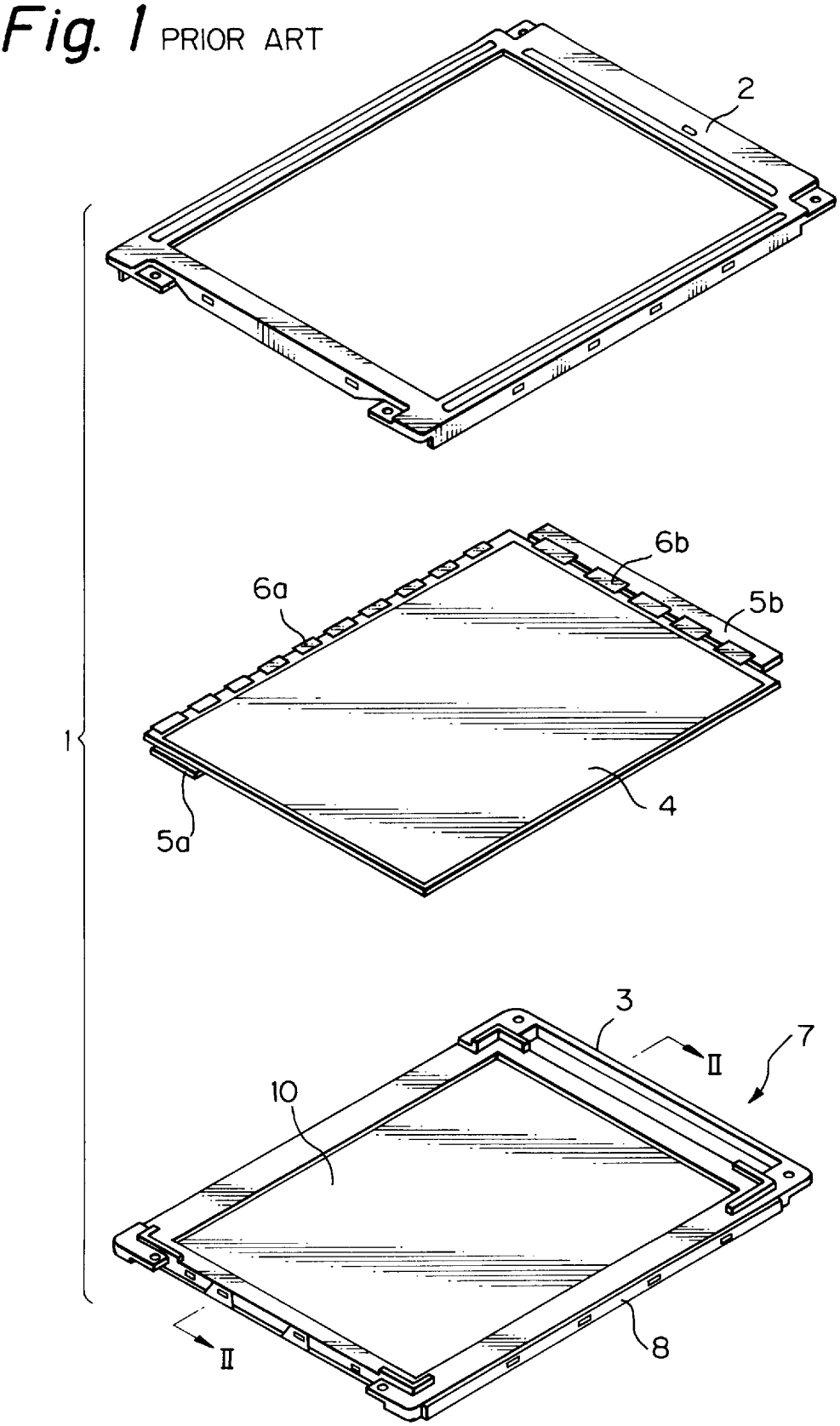
FIG. 1 is an exploded perspective view showing a conventional LCD.
Figure 2:
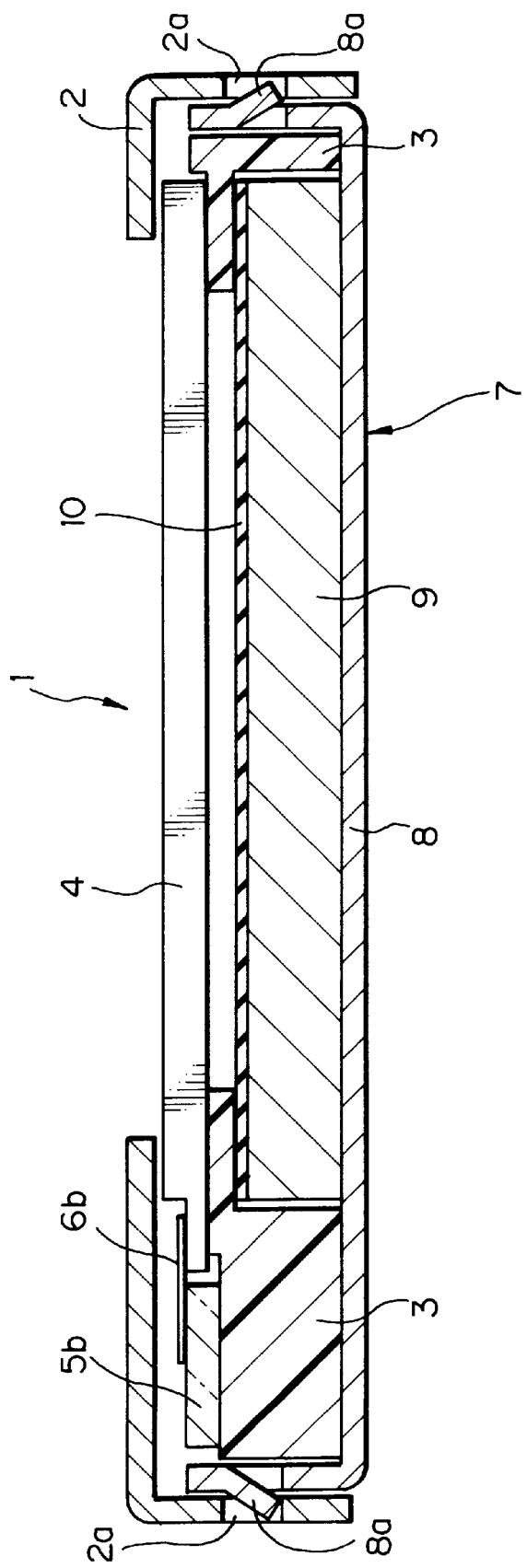
FIG. 2 is a section along line II—II of FIG. 1.

To better understand the present invention, brief reference will be made to a conventional LCD, shown in FIGS. 1 and 2. As shown, the LCD, generally 1, is generally made up of a display device 4, a backlight assembly 7, and a front metallic frame 2. The backlight assembly 7 and front metallic frame 2 sandwich the display device 4 therebetween. The metallic frame 2 is formed with holes in its side walls, as will be described specifically later. Circuit boards 5a and 5b assigned to a gate driver and a source driver, respectively, are arranged around the display device 4. TCPs (Tape Carrier Packages) 6a and TCPSs 6b assigned to the gate driver and source driver, respectively, connect the circuit boards 5a and 5b to the display device 4. While the circuit board 5b is substantially flush with the display device 4, the circuit board 5a has the associated TCPs 6a bent and positioned on the rear of the display device 4.

The backlight assembly 7 includes a light guide plate 9 implemented by a cold cathode fluorescent tube and acrylic resin, a lens sheet or similar optical sheet 10, a chassis in the form of a molding 3 holding the plate 9 and sheet 10, and a rear metallic frame 8. The rear metallic frame 8 has a box-like configuration and has locking lugs 8a on its side walls.

To assemble the LCD 1, the display device 4 and front metallic frame 2 are sequentially stacked on the backlight assembly. At this instant, the locking lugs 8a of the frame 8 mate with holes 2a formed in the frame 2 in order to lock the display device 4 between the frames 8 and 2. The molding 3 is formed of ABS (acrylonitrile-butadiene-styrene), PC (polycarbonate) or similar hard resin.

Figure 3:
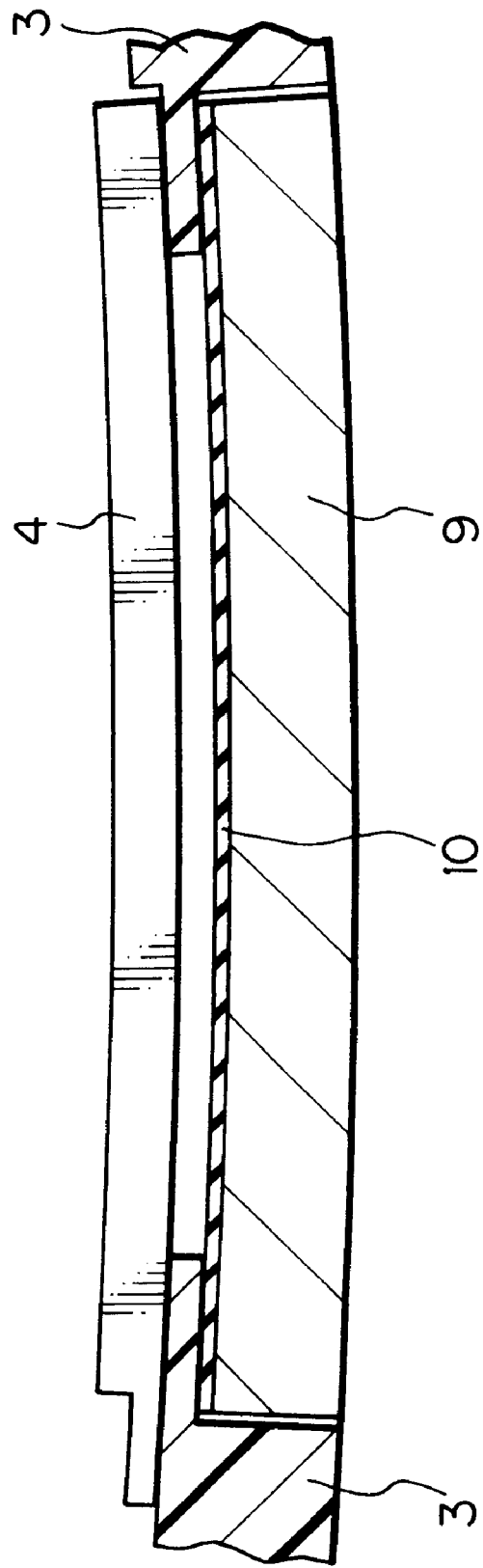
FIG. 3 shows the conventional LCD subjected to an impact force.
Figure 4:
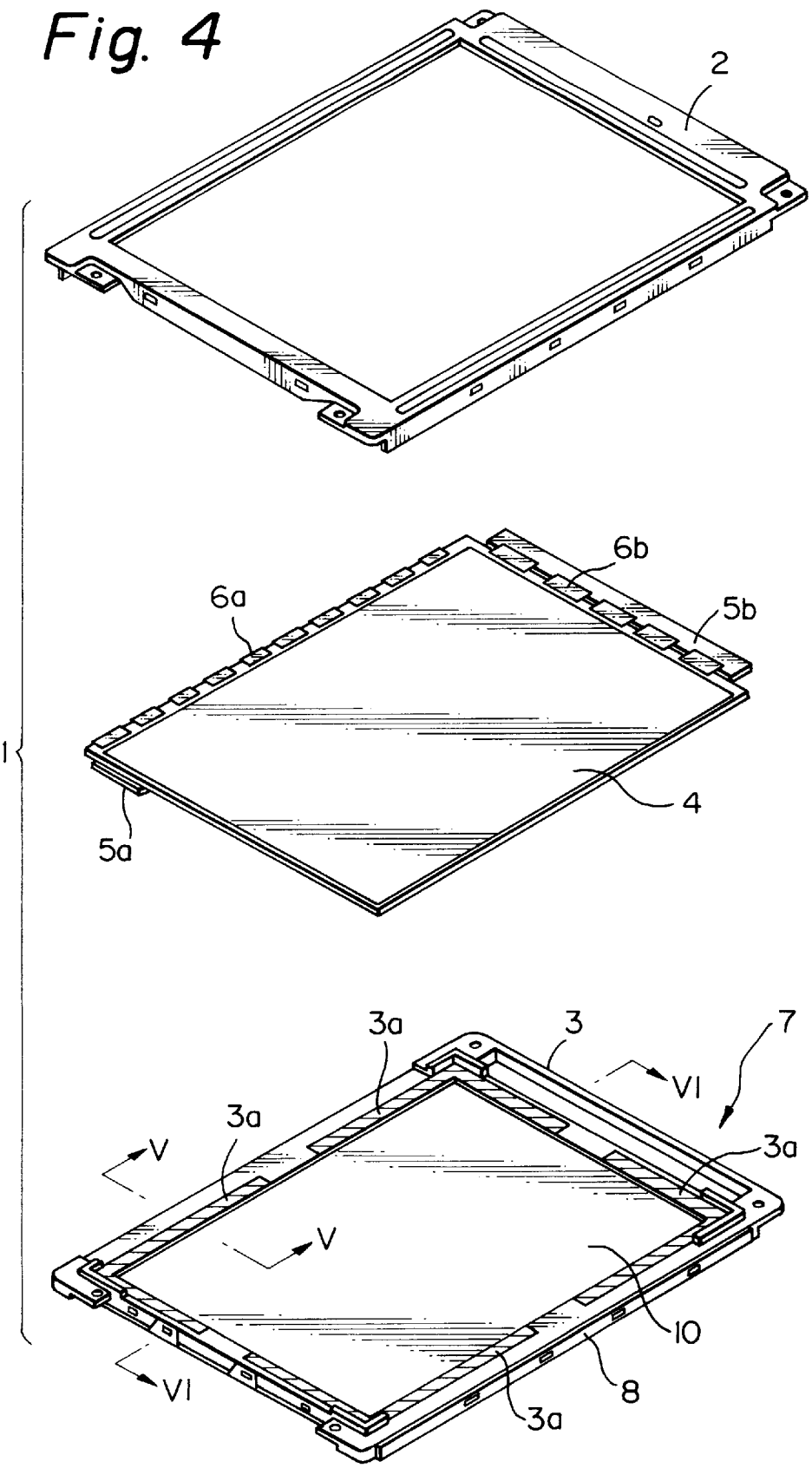
FIG. 4 is an exploded perspective view showing an LCD embodying the present invention.

The light guide plate 9 occupies a major part of the volume of the backlight assembly 7 and has a substantial weight, but the plate 9 is relatively soft because it is formed of acrylic resin. Therefore, the plate 9 is apt to deform when subjected to an extraneous impact, as shown in FIG. 3. Because the molding 3 between the plate 9 and the display device 4 is formed of hard resin, the display device 4 deforms simultaneously with the plate 9. The deformation causes the display device 4 to break up easily because the display device 4 is formed of glass. Even if the display device 4 does not break, it continuously oscillates at its characteristic frequency even after the extraneous force disappears. As a result, the display device 4 is apt to suffer from secondary breakage.

The present invention is a solution to the above problems. Briefly, in accordance with the present invention, an LCD includes a chassis supporting a display device thereon. The chassis has its portions contacting the intermediate portions of the four sides of the display device formed of a relatively hard material, and has its portions contacting the four corners of the display device formed of a relatively soft elastic material. The chassis may be implemented as a single molding of resin. The resin forming the portions of the molding contacting the intermediate portions of the four sides of the display device may have a hardness higher than 60 H inclusive. On the other hand, the resin forming portions of the molding contacting the four corners of the display device may have a hardness lower than 40 H inclusive.

The above chassis may be produced by forming two different kinds of portions each having a particular hardness in a single molding produced by two-color injection molding. The relatively hard resin may be one of ABS, PC and PC/ABS alloy with or without glass fibers or carbon fibers added thereto, while the relatively soft elastic resin may be one of polyester, polyurethane, and silicone resin. The relatively soft elastic portions of the molding may be formed of one of PC, PC/ABS alloy, polyester, silicone resin, and polychloroprene. To form the elastic portions, such a resin may be caused to foam during molding.

The chassis, including the portions for supporting the four corners of the display device, should preferably be formed of a light shielding material. This successfully prevents needless light from being incident to the display device from a backlight.

Figure 5:
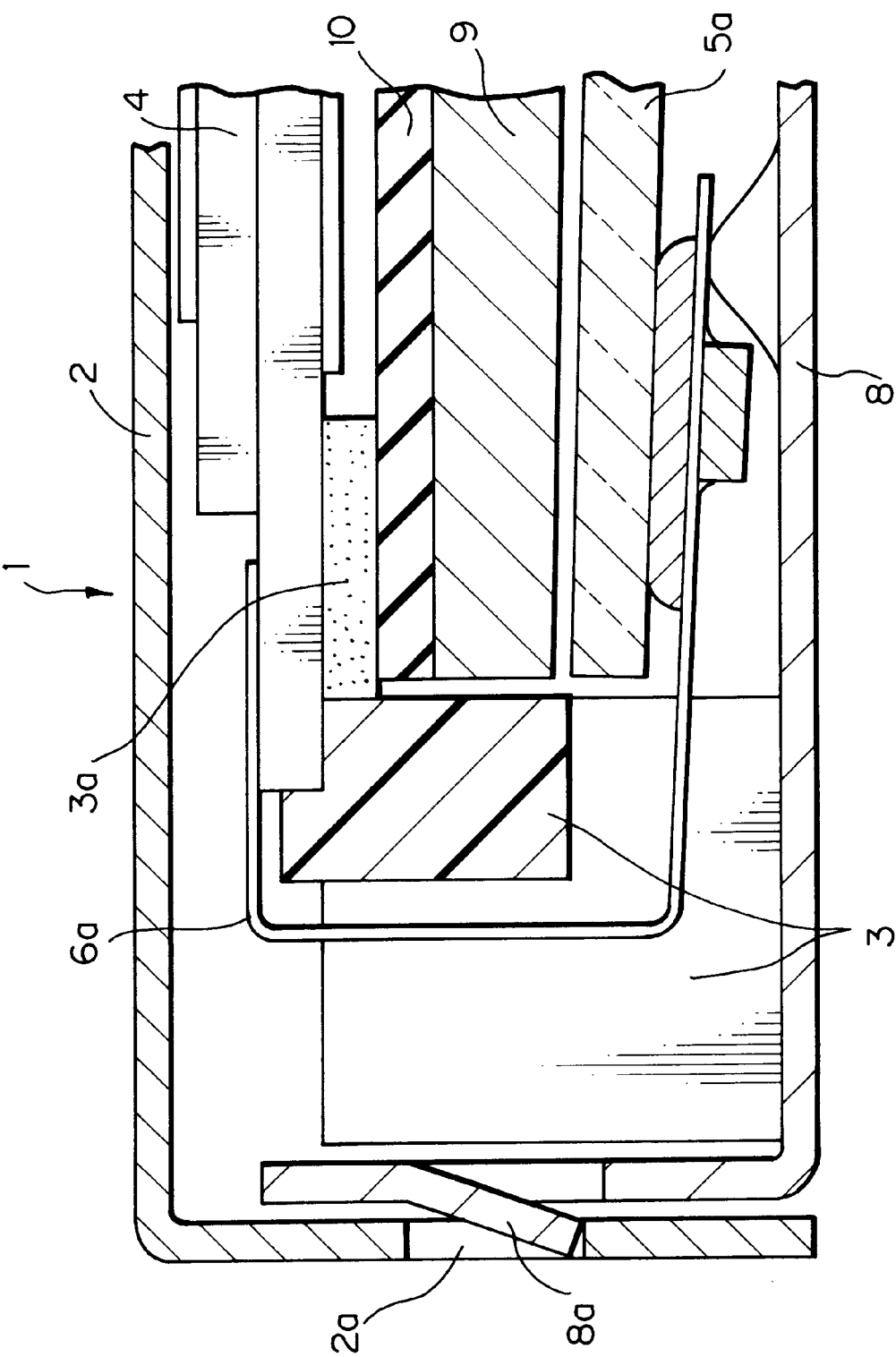
FIG. 5 is a section along line V—V of FIG. 4.

Referring to FIGS. 4–7, an LCD embodying the present invention will be described. As shown in FIG. 5, the LCD, generally 1, includes a circuit board 5a associated with a gate driver. The circuit board 5a is disposed in a space available between a light guide plate 9 and a rear metallic frame 8. TCPs 6a connecting the circuit board 5a and a display device or panel 4 each is bent in the form of a letter U.

A chassis 3 is implemented as a single molding. The illustrative embodiment differs from the conventional LCD shown in FIG. 1 in that the portions of the chassis 3 contacting the four corners of the display device 4 are formed of a relatively soft elastic material, constituting elastic portions 3a. Therefore, in the embodiment, the display device 4 is supported by the relatively hard portions of the chassis 3 at the intermediate portions of its four sides, but supported by the elastic portions 3a at its four corner portions.

In the illustrative embodiment, the entire chassis 3 is implemented as a single molding of PC; PC is caused to partly foam during molding in order to form the elastic portions 3a. Because the chassis 3 including the elastic portions 3a is formed of a single material, tight bond between the elastic portions 3a and the other portions of the molding 3 is enhanced.

Figure 6:
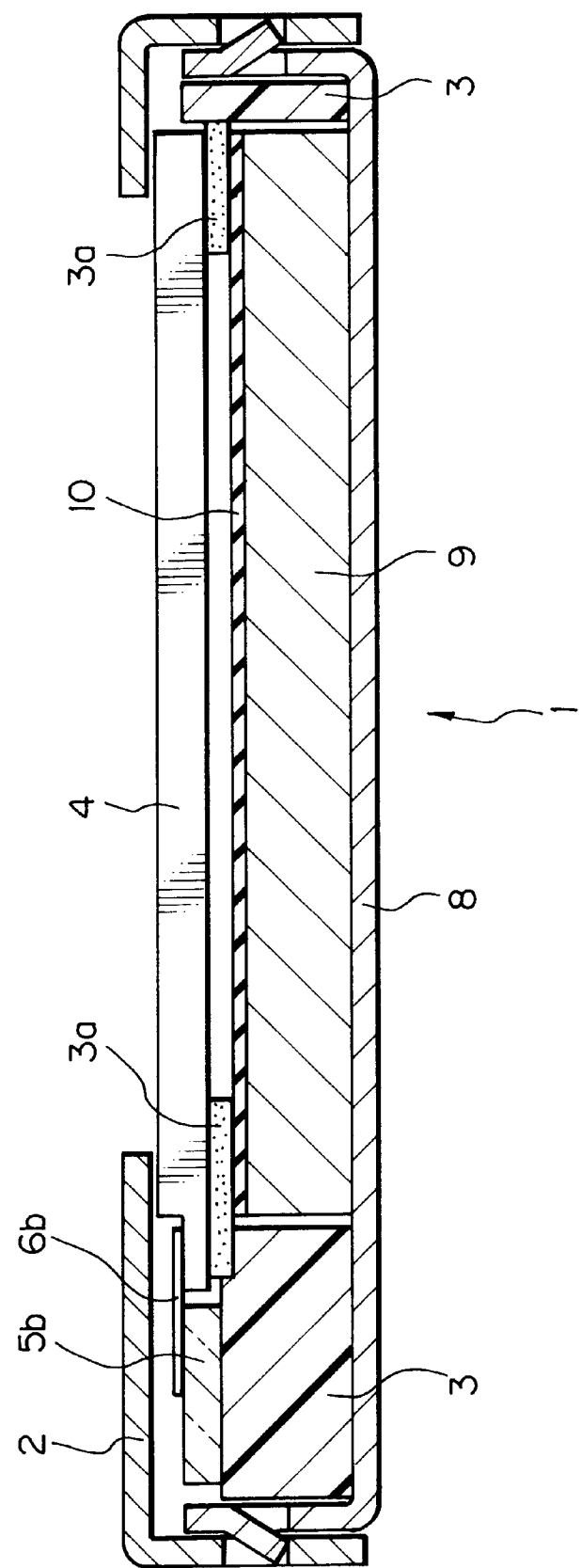
FIG. 6 is a section along line VI—VI of FIG. 4.
Figure 7:
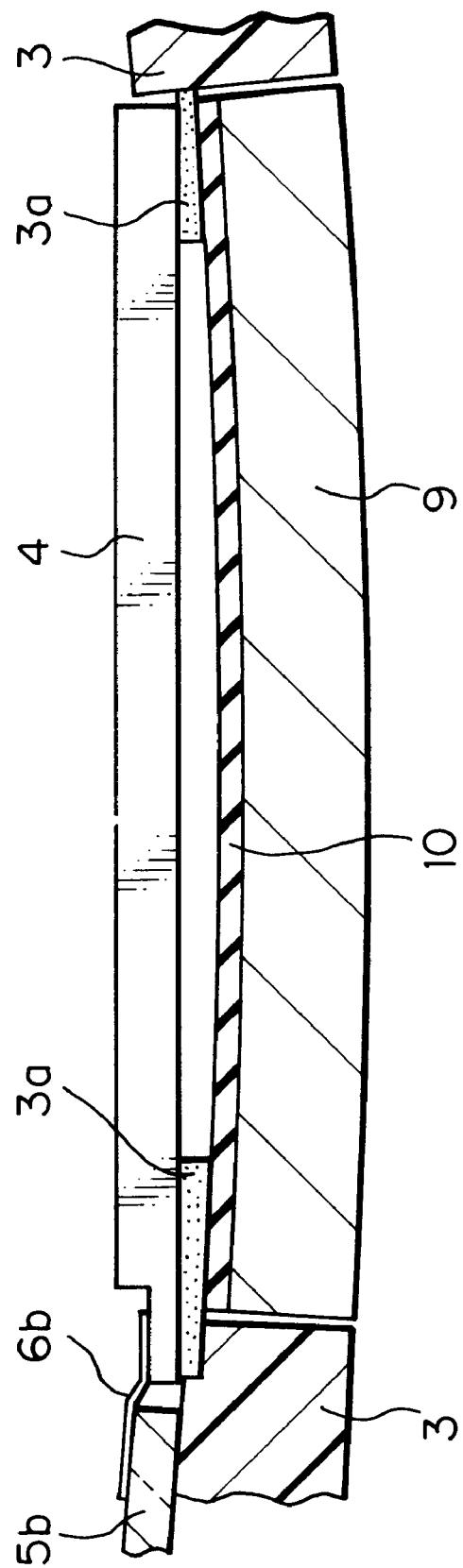
FIG. 7 shows the LCD of FIG. 4 subject to an impact force.

Assume that an extraneous impact acts on the LCD 1 in the thicknesswise direction, i.e., downward as viewed in FIG. 6. Then, as shown in FIG. 7, the light guide plate 9 undergoes the greatest displacement at its center because the LCD 1 is usually mounted on an electronic apparatus via holes formed in its four corners. At this instant, the LCD 1 bends at the greatest angle at its four corners. However, in the illustrative embodiment, the elastic portions 3a of the chassis 3 intervene between the light guide plate 9 and the display device 4. As a result, as shown in FIG. 7, the display device 4 remains substantially flat without regard to the deformation of the light guide plate 9 and is free from breakage ascribable to bending. Moreover, the display device 4 is sustained at the intermediate portions of its four sides, so that the frequency of characteristic oscillation ascribable to an impact can be increased. This, coupled with the fact that the elastic portions 3a absorb the characteristic oscillation, frees the display device 4 from secondary breakage.

In summary, in accordance with the present invention, an LCD includes a display device sustained by relatively soft elastic members at its four corners and by rigid members at the intermediate portions of its four sides. Therefore, the positional accuracy of the display device in the thicknesswise direction of its substrate and stable support are insured. Even when the LCD deforms due to an impact, the display device undergoes a minimum of deformation and is free from breakage. Further, the characteristic frequency of the display device is increased. This, coupled with the fact that the elastic portions absorb oscillation, protects the display device from secondary breakage.

Various modifications will become possible for those skilled in the art after receiving the teachings of the present disclosure without departing from the scope thereof.

What is claimed is:

1. An LCD comprising:

a display device;

a chassis connected to at least a peripheral portion of an underside of said display device; and a front frame retaining said display device between said font frame and said chassis;

said chassis having portions thereof contacting intermediate portions of four sides of said underside of said display device, the part of said chassis contacting intermediate portions of four sides of said underside of said display device being formed of a relatively hard material, and said chassis having portions contacting four corners of said underside of said display device formed of a relatively soft material.

2. An LCD as claimed in claim 1, wherein said chassis is formed of relatively hard resin except for said portions contacting said four corners of said display device, only said portions contacting said four comers being formed of a relatively soft elastic resin.

3. An LCD as claimed in claim 2, wherein the relatively hard comprises one of ABS, PC, and PC/ABS alloy with or without glass fibers or carbon fibers added thereto, while the substantially malleable elastic resin comprises one of polyester, polyurethane, and silicon resin.

4. An LCD as claimed in claim 2, wherein said chassis comprises a single molding produced by two-color extrusion molding.

5. An LCD as claimed in claim 4, wherein the relatively hard resin comprises one of ABS, PC and PC/ABS alloy with or without glass fibers or carbon fibers added thereto, while the relatively soft elastic resin comprises one of polyester, polyurethane, and silicone resin.

6. An LCD as claimed in claim 4, wherein said portions of said molding contacting said four corners of said display device are formed of one of PC, PC/ABS alloy, polyester, silicone resin, and polychloroprene, the resin forming said portions being caused to foam during molding.

* * * * *

UNITED STATES PATENT AND TRADEMARK OFFICE
CERTIFICATE OF CORRECTION

PATENT NO. : 5,929,950
DATED : July 27, 1999
INVENTOR(S) : Satoru MATSUDA

It is certified that error appears in the above-identified patent and that said Letters Patent is hereby corrected as shown below:

Column 4, line 45, delete "font" and insert --front--;

Column 4, line 58, delete "comers" and insert --corners--;

Column 4, line 61, after "hard", insert --resin--;

Column 4, line 63, delete "substantially malleable" and insert --relatively soft--.

Signed and Sealed this

Twenty-first Day of March, 2000

Attest:

Q. TODD DICKINSON

Attesting Officer    Commissioner of Patents and Trademarks